CIRCUIT ARRANGEMENT FOR VARYING THE LEVEL OF A SIGNAL

Filed April 15, 1964 2 Sheets-Sheet 1

Jnventor:
Edmund Jauernik
Achim Bopp
by Michael J. Striker
Attorney

CIRCUIT ARRANGEMENT FOR VARYING THE LEVEL OF A SIGNAL

Filed April 15, 1964 2 Sheets-Sheet 2

Jnventor:
Edmund Jauernik
Achim Bopp
by Michael S. Striker
Attorney

United States Patent Office 3,351,867

Patented Nov. 7, 1967

3,351,867

CIRCUIT ARRANGEMENT FOR VARYING THE LEVEL OF A SIGNAL

Edmund Jauernik and Achim Bopp, Darmstadt, Germany, assignors to Fernseh G.m.b.H., Darmstadt, Germany Filed Apr. 15, 1964, Ser. No. 360,021
Claims priority, application Germany, June 20, 1963, F 40,013
10 Claims. (Cl. 330—16)

ABSTRACT OF THE DISCLOSURE

A circuit for varying the level of video signals between zero and a predetermined maximum value, in a substantially linear manner. An input and output amplifier are interconnected through a coupling network in the form of a bridge. The bridge has four non-linear circuit elements connected in sequence. A variable resistor connected to the bridge serves to bias the operating level thereof and thereby makes possible variations in the level of the video signals applied to the input amplifier. Capacitive elements may be connected to the bridge to compensate for the capacitive characteristics of the non-linear circuit element within the bridge.

The present invention relates to a circuit arrangement for varying the level of a signal and, more particularly, to a circuit arrangement for varying the level of a video signal.

It is a broad object of the present invention to provide a novel gain control circuit for amplifiers operating in the video frequency range.

It is a further object of the present invention to provide a novel automatically gain controlled transistor amplifier.

It is still a further object of the present invention to provide a transistor circuit, in which the levels of video signals are remote controlled from zero value to a maximum level without considerable linearity deviations (differential amplitude distortion) and without considerable variations in frequency response.

It is another object of the present invention to provide a novel circuit arrangement controlling the levels of video signals from zero value to a maximum level of 1 $V_{ss}$ without linearity deviations greater than ±2% and without variations in frequency response greater than 1 db up to 7 mc./s.

It is an additional object of the present invention to provide a circuit arrangement requiring an input voltage of 0.1 v. only.

It is still an additional object of the present invention to provide a gain control circuit wherein the control voltage has no reactive effects upon the transmitted signal.

According to the present invention there is provided a circuit arrangement for varying the level of a signal comprising a first amplifier stage, a second amplifier stage, a coupling network and means for altering the impedance of said coupling network consisting of four circuit elements with a non-linear voltage/current characteristic and being connected via a first, a second, a third and a fourth junction point to a bridge connection. This signal is transmitted via said first amplifier and via said coupling network to said second amplifier stage, the level of said signal being altered in dependence upon the impedance of said coupling network.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

In all these drawings corresponding elements are designated by the same reference symbols.

Figure 1:
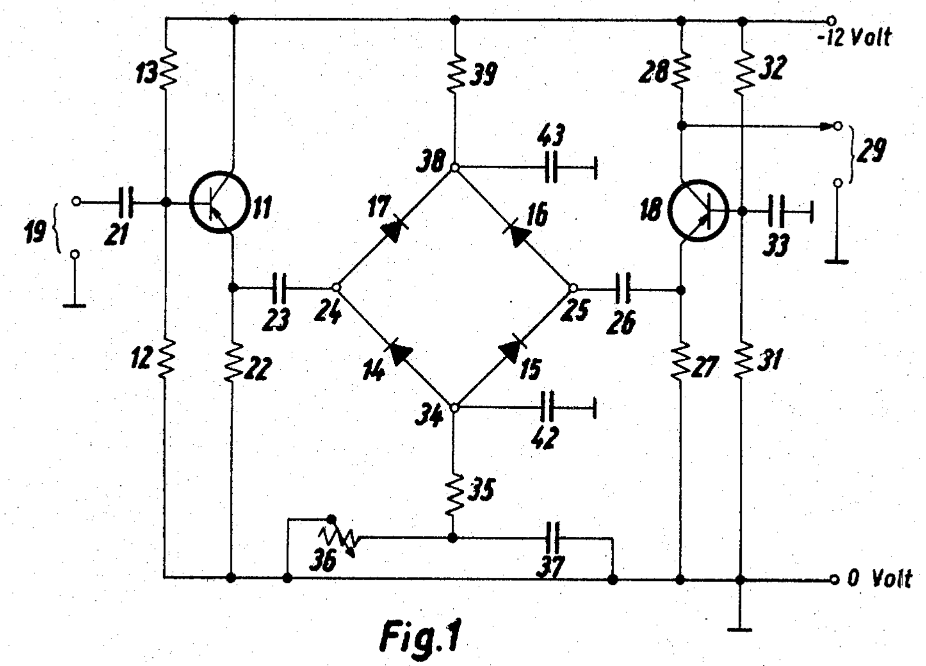
FIG. 1 is a diagram of a transistor circuit with a diode bridge connection as coupling network.

The circuit arrangement described in relation to FIG. 1 comprises a first transistor stage, a second transistor stage and a coupling network. The first transistor stage consists of a transistor 11, of the resistors 12 (10K ohms), 13 (4.7K ohms), 22 (270 ohms) and of the condenser 21 (100 μf.). The collector-emitter path of this transistor 11 is connected, on the one hand, to the negative pole (−12 v.) of an operating voltage source and, on the other hand, to the positive pole (0 v.) of said source.

A video signal is applied via the terminals 19, the condenser 21 and the transistor 11 to the coupling network consisting of the condenser 23, the diodes 14, 15, 16, 17 and the condenser 26. This video signal is thus transmitted via the second junction point 24 and the fourth junction point 25 to the second transistor stage with the transistor 18, the resistors 27 (270 ohms), 28 (560 ohms), 31 (10K ohms), 32 (47K ohms) and the condenser 33 (100 μf.).

The third junction point 34 is connected by way of the resistor 35 (820 ohms) to one of said poles (0 v.) of the operating voltage source by way of the variable resistor 36 (maximum 5K ohms), on the one hand, and by way of the condenser 37 (100 μf.), on the other hand. The first junction point 38 is connected by way of the resistor 39 (820 ohms) to the other pole of the operating voltage source. The total resistance of the coupling network with the diodes 14 to 17 is adjustable (in particular also remote adjustable) in the direction of the second junction point 24 to the fourth junction point 25 by the use of variable resistor 36. Instead of using diodes 14 to 17 also other non-linear resistors, for example four voltage dependent resistors may be used. From the output terminals 29 there is then taken a video signal, of which the level is adjustable from zero to a maximum level in proportion with the value of the variable resistor 36. In particular, when the value of the variable resistor 36 is relatively small or large respectively, a relatively small or large total impedance respectively of the coupling network is effected between the junction points 24 and 25, resulting in a relatively large or small level respectively of the video signal taken from the output terminals 29. Thus the maximum level is obtained, when the variable resistor 36 is short-circuited.

The diodes 14 to 17 have an unavoidable circuit capacitance, which could be illustrated in an equivalent circuit diagram by respective condensers (not shown) connected in parallel with these diodes 14 to 17. Parallel to the coupling network between the junction points 24 and 25 is thus said unavoidable total circuit capacitance. This circuit capacitance (of the diodes 14 to 17) may effect variations in the frequency response, when the total impedance of the diodes 14 to 17 is altered.

Figure 2:
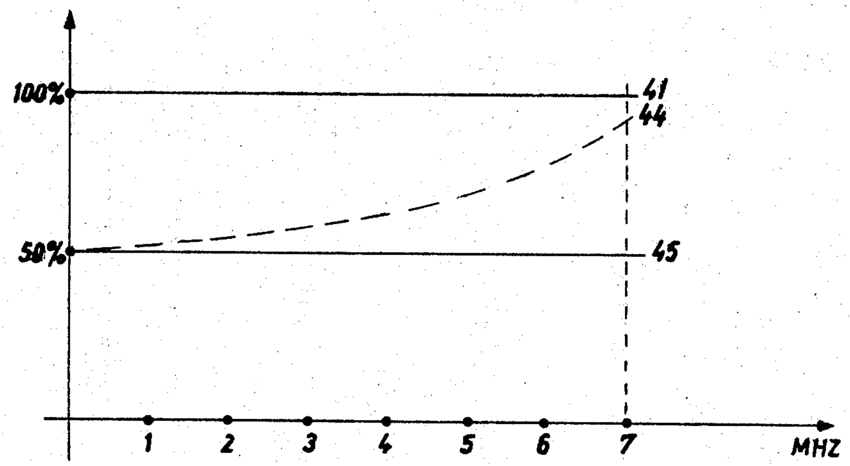
FIG. 2 is a diagrammatical representation of the frequency response of the video signal transmitted by way of the circuit arrangement described in relation to FIG. 1.

FIG. 2 shows the frequency response of the transmitted video signal, the levels of the video signal in percentages of the maximum level (100 percent) being plotted against the frequencies from 1 to 7 mc./s. When the variable resistor 36 (FIG. 1) is adjusted such that a video signal of the maximum level 100 percent is taken from the output terminals 29, then this video signal has a frequency response according to curve 41. When the variable resistor is, however, adjusted such that a video signal of a level of 50 percent is taken from the output terminals 29 then, due to the total circuit capacitance assumed to be in parallel with the circuit arrangement at the junction points 24 and 25, a frequency response according to the curve 44 would be obtained without application of the condensers 42, 43 (each 100 pf.). The condensers 42 and 43 respectively (FIG. 1) are frequency-dependent members and should have such a frequency response, that frequency response variations, due to variations of the total resistance of the diodes 14 to 17, are opposed. In particular, these condensers 42 and 43 shall effect such a frequency response, that there is obtained a frequency response according to curve 45, which is approximately linear up to 7 mc./s.

Figure 3:
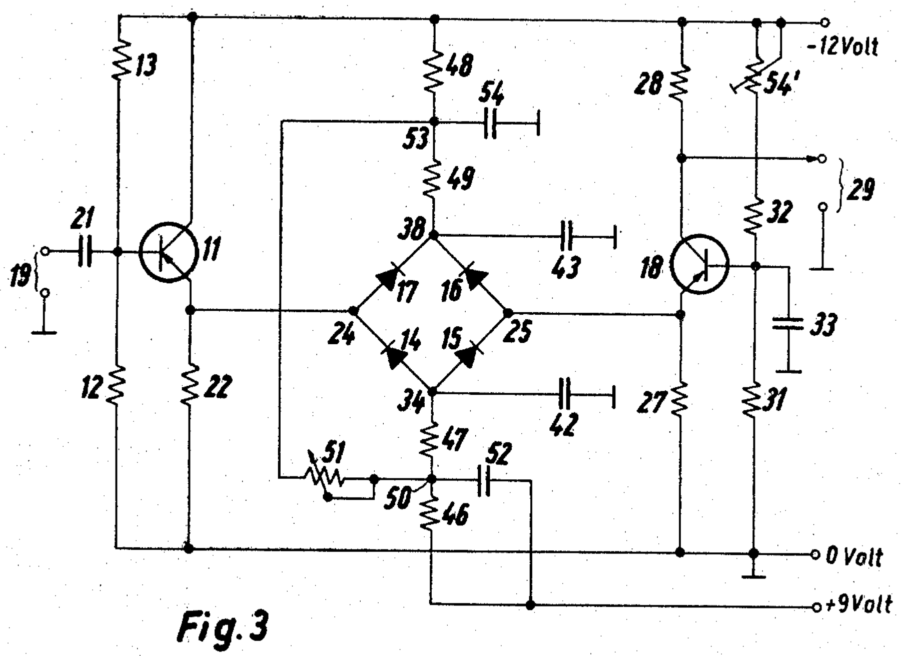
FIG. 3 is a representation of one embodiment of a transistor stage, in greater detail, in which the variation of the bias voltage of the non-linear circuit elements is effected by a variable resistor.

In the circuit arrangement described in relation to FIG. 3 the bias voltage of the diodes 14 to 17 is determined by the use of two voltage dividers, of which the one comprises resistors 46 (1K ohm), 47 (820 ohms) and the other one resistors 48 (1K ohm), 49 (820 ohms). The tapping 50 of the one voltage divider is connected, on the one hand, to one end of the variable resistor 51 (maximum 5K ohms) and, on the other hand, to the positive pole (+9 v.) of a voltage source by way of the condenser 52. The tapping 53 of the other voltage divider 48/49 is connected to the other end of the variable resistor 51 and to one plate of the condenser 54 (100 $\mu$f.). The circuit arrangement described in relation to FIG. 3 is furthermore distinguished from that described in relation to FIG. 1 in that the emitters of the transistors 11 and 18 respectively are here galvanically connected to the second and fourth junction point 24 and 25 respectively and in that there is provided a balancing resistance 54' (10K ohms) (for adjusting the linearity). The video signal is applied to the terminals 19 with a level of 0.1 $V_{ss}$ and is taken from the terminals 29 with a level of 1 $V_{ss}$.

Figure 4:
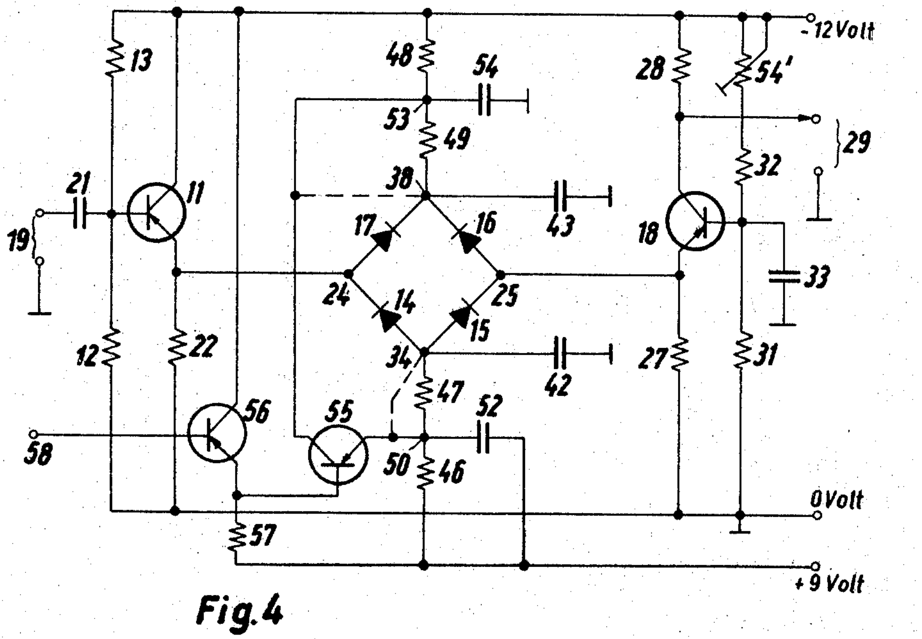
FIG. 4 is a representation of one embodiment of a transistor stage, of which the gain is automatically controlled.

In the circuit arrangement described in relation to FIG. 4 the variable resistor 51 (FIG. 3) is replaced by the emitter-collector path of a transistor 55, its resistance being controlled by way of the base, the transistor 56 and the resistor 57 serving as impedance converter and a control voltage being applied to the base of said transistor 56 by way of the terminal 58, said control voltage effecting an automatic gain control.

If the circuit arrangement described in relation to FIG. 4 is modified such that the emitter of the transistor 55 is connected to the third junction point 34 (and not to the tapping 50) and that the collector of the transistor 55 is connected to the first junction point 38 (and not to the tapping 53), this circuit arrangement is also applicable for the grain control in proportion with a control voltage, which is applied by way of the terminal 58. In some cases it is advisable to apply as such a control voltage a sawtooth voltage. In this case at the output terminals 29 a mixed signal is available consisting of parts of the video signal applied by way of the input terminal 19 and of parts of the sawtooth voltage applied by way of terminal 58. The circuit arrangement according to the invention is not restricted to the use of transistors, since these transistors may be replaced by corresponding amplifier elements, in particular amplifier tubes.

While the invention has been illustrated and described as embodied in an arrangement for controlling the gain of transistor amplifiers it is not intended to be limited to the details shown, since various modifications and structural changes may be made without departing in any way from the spirit of the present invention.

What is claimed as new and desired to be secured by Letters Patent is:

1. An electronic circuit arrangement for varying the level of a signal comprising, in combination, a voltage source having a first polarity terminal and a second polarity terminal; four non-linear circuit elements having non-linear voltage/current characteristics and connected in sequence as a four-armed bridge for four consecutive bridge terminals, the first one of which is connected to said first polarity terminal; variable resistor means connected between said second polarity terminal and the third consecutive bridge terminal; first amplifier means connected to said voltage source for providing operating voltages thereto and having an output connected to the second consecutive bridge terminal for applying a voltage signal to said bridge; and second amplifier means connected to said voltage source for providing operating voltages thereto and having an input connected to the fourth consecutive bridge terminal; whereby said bridge is a coupling network between said first and second amplifier means to vary the level of a signal applied to said first amplifier means by varying said variable resistor means.

2. The electronic circuit arrangement as defined in claim 1, wherein said non-linear circuit elements are diodes.

3. The electronic circuit arrangement as defined in claim 1, wherein said non-linear circuit elements are voltage dependent resistors.

4. The circuit arrangement as defined in claim 1, including first capacitor means connected between the first bridge terminal and said second polarity terminal of said voltage source; and second capacitor means connected to the third bridge terminal and said second polarity terminal for compensating against the capacitive effects of said non-linear circuit elements.

5. The circuit arrangement as defined in claim 1 wherein said first amplifier means is a transistor with collector connected to said first polarity terminal and emitter connected to said second polarity terminal and to the second terminal of said bridge, the base of said transistor being the input element of said amplifier means.

6. The circuit arrangement as defined in claim 1, wherein said second amplifier means is a transistor with collector connected to said first polarity terminal and emitter connected to said second polarity terminal and to the fourth terminal of said bridge, the collector of said transistor being the output element of said second amplifier means.

7. The circuit arrangement as defined in claim 1, including fixed resistor means connected between the first terminal of said bridge and said first polarity terminal of said voltage source.

8. The circuit arrangement as defined in claim 1, including fixed resistor means connected between the third terminal of said bridge and said variable resistor means.

9. The circuit arrangement as defined in claim 1, including first voltage divider means connected between said first polarity terminal and the first terminal of said bridge; second voltage divider means connected between said second polarity terminal and the third terminal of said bridge, each of said voltage dividers comprising two resistors connected in series by a junction; and means for connecting said variable resistor means between the junction of said first voltage divider means and the junction of said second voltage divider means.

10. The circuit arrangement as defined in claim 9, wherein said variable resistor means is a transistor with emitter/collector path connected between the junction of said first voltage divider means and the junction of said second voltage divider means, the base potential of said transistor serving for varying the resistance of said variable resistor means.

References Cited

UNITED STATES PATENTS

| | | | |
|---|---|---|---|
| 2,247,328 | 6/1941 | Davey ---------- | 330—175 X |
| 2,890,290 | 6/1959 | Hemphill et al. ---- | 330—175 X |

FOREIGN PATENTS

| | | |
|---|---|---|
| 949,582 | 9/1956 | Germany. |

NATHAN KAUFMAN, *Acting Primary Examiner.*

ROY LAKE, *Examiner.*